United States Patent Office 3,025,326
Patented Mar. 13, 1962

3,025,326
PHOSPHINOBORINE COMPOUNDS AND
THEIR PREPARATION
Anton B. Burg, Los Angeles, and Ross I. Wagner, Whittier, Calif., assignors, by mesne assignments, to American Potash & Chemical Corporation, a corporation of Delaware
No Drawing. Filed Apr. 16, 1959, Ser. No. 806,742
38 Claims. (Cl. 260—606.5)

This invention relates in general to the preparation of phosphinoborine polymers, the boron atoms of which are halogenated, and more particularly to the preparation of B-halogenated phosphinoborine polymers by the treatment with a halogenating agent of a preformed phosphinoborine compound in such a fashion that B-halo phosphinoborine compounds are formed of a structure predetermined by the nature of the substituents present on the phosphorus and boron moieties before halogenation.

Phosphinoborines, compounds which are polymeric in nature and which are composed of a number of units joined one to the next, each of the units being composed of a phosphorus atom joined to an adjacent boron atom, are described in abandoned application Serial No. 446,147 filed July 27, 1954, by Anton B. Burg and Ross I. Wagner, for Phosphinoborine Compounds and Their Preparation. As set forth here and in the various co-pending continuation-in-part applications filed subsequent to the aforementioned application, these phosphinoborine compounds are of value as high temperature dielectric materials. The phosphinoborine compounds having one or more halogen groups bonded to the boron atom are in certain respects superior to the basic phosphinoborine compounds having no halogens bonded to the boron. That is, they are superior in certain applications. They have somewhat higher melting points and greater oxidative stability than the corresponding non-halogenated phosphino-borines, and thus may be used in applications where only the most high melting of the phosphinoborine materials may be employed, i.e., one such application is as a dielectric material where extremely high temperatures and opportunities for chemical reaction are encountered. However, the preparative methods available for the manufacture of the B-halogenated phosphinoborine compounds are in certain respects more difficult than the preparative methods available for the manufacture of the corresponding non-B-halogenated phosphinoborine compounds.

It is therefore an object of this invention to provide for the preparation of B-halogenated phosphinoborine compounds, the halogen substituents of which may or may not be mixed.

Another object of the invention is to provide for the preparation of phosphinoborines, the B atoms of which may be bonded to halogen atoms.

A further object of this invention is to provide a method for the production of B-halogenated phosphinoborine compounds which involves the treatment of a preformed phosphinoborine compound with a halogenating agent.

Still another object of this invention is to provide a halogenating method for use with phosphinoborine compounds, which method does not affect the polymeric nature of the phosphinoborine compound treated; that is, where a compound treated is initially a linear polymer it will remain such and where a compound is initially a cyclic polymer it will continue to be a cyclic polymer following treatment with the halogenating agent and will exhibit the general properties common to cyclic phosphinoborine polymers.

Broadly, it has been found that phosphinoborines which have been preformed either as linear or cyclic polymers may be treated thereafter with certain halogenating agents whereby to convert the phosphinoborine analog. A phosphinoborine may be prepared from the appropriate phosphine borine by pyrolysis and the phosphinoborine treated with the appropriate halogenating agent. Such halogenating agents are the free halogens, hydrohalogen acids and reactive halogenated hydrocarbons in which the halogen is bonded to a saturated carbon atom. The halogenated hydrocarbons may be used alone or together with a catalyst such as an aluminum halide.

More particularly, a process has been developed which is suitable for the preparation of B-halogenated phosphinoborines which involves the use of preformed phosphinoborines of the type $[RR'PBHR'']_n$ where R and R' represent hydrocarbon substituents and R'' represents either hydrogen or a hydrocarbon substituent. These preformed phosphinoborines thereafter are treated with a halogenating agent such as a free halogen, a hydrohalogen acid or a reactive halogenated aliphatic hydrocarbon in which the halogen is bonded to a saturated carbon atom. Commercially available reactive halogenated hydrocarbons are the halogenated methanes, monohalo-substituted hydrocarbons having from 2–8 carbon atoms (compounds of the type $C_2H_{6-n}X_n$ where $n=1$–6) chlorinated and brominated $C_3$ compounds and $(CH_2)_2Br_2$. A particularly effective representative of the group $C_2H_{6-n}X_n$ is $C_2Cl_6$. In short, any of the hydrocarbon materials commonly used as halogenating agents may serve.

One phase of this process involves the halogenation of a phosphinoborine of the general formula $[RR'PBHR'']_n$ with a halogenated material of the general formula $CYY'Y''X$ wherein X represents a halogen and the "Y" symbols are either hydrogen or halogen or together represent a lower alkyl radical. Such materials are generally referred to as halogenated hydrocarbons (and are so designated hereinafter), even though, as is the case with carbon tetrachloride, all hydrogens of the original hydrocarbon have been replaced with halogen atoms. Preferably, aluminum halides are used as catalysts. However, a catalyst is not essential. The halogen present in the catalyst should correspond to the halogen of the halogenating agent. That is, the halogen should correspond provided it is not desired to obtain a phosphinoborine having mixed halogens bonded to the boron. The utilization of the process wherein mixed halogens are present whereby to produce a phosphinoborine which has mixed halogen atoms is set forth in Example X below. It has been found that the use of aluminum chloride alone as a catalyst is not a satisfactory way to produce the halogenated phosphinoborine. An effort to substitute chlorine in a dimethylphosphinoborine trimer using $AlCl_3$ in the absence of an alkyl halide resulted only in the degradation of the phosphinoborine and the benzene solvent.

The reaction is carried out at a temperature of 0°–200° C. and preferably from 20°–150° C. The lower portion of the preferred temperature range is suitable when a catalyst is used and the higher temperatures are required without a catalyst. The reaction is carried out in the presence of a solvent and the halogenated hydrocarbon used generally serves this purpose as well. Under certain circumstances hydrocarbon solvents such as benzene or petroleum ether may also be used.

Examples of this phase of the process are set forth below by way of illustration.

EXAMPLE I

A solution of 13.7 g. (0.0618 mole) $[(CH_3)_2PBH_2]_3$ in 137.3 g. (0.892 mole) $CCl_4$ was sealed in a Pyrex tube under vacuum. The tube was heated at 130° C. for 113 hours during which time a crystalline precipitate formed. The tube was cooled and opened and the solvent was distilled into a tared weighing tube. The recovered solvent mixture weighed 124.8 g. indicating that 5.86 gram-atoms of chlorine (97.6 percent) had exchanged with hydrogen per mole of dimethylphosphinoborine trimer. The product, [(CH₃)₂PBCl₂]₃, melted at 377–8° C.

EXAMPLE II

A 0.0468 g. (0.135 mmole) sample of the simplest dimethylphosphinoborine - methylphosphinoborine copolymer, [(CH₃)₂PBH₂]₄CH₃PBH, and 1.2036 g. (7.824 mole) CCl₄ were heated in a sealed tube at 140° C. for 17 hours. The tube was cooled and opened. The solvent was recovered and weighed 1.1658 g. From the weight loss the product was determined to be

[(CH₃)₂PBCl₂]₄CH₃PBH

Details with respect to the structure of the copolymer described herein may be found in our co-pending application Serial No. 680,625, filed August 27, 1957.

EXAMPLE III

A 0.5196 g. (1.97 mmoles) sample of

[CH₃(C₂H₅)PBH₂]₃ and 11.7762 g. (76.55 mmoles) CCl₄ were sealed in a tube and heated at 120° C. for 14.5 hours. The tube was cooled and opened and the loss in weight of the solvent was determined to be 0.2878 g. From the loss in weight the average number of chlorine atoms per mole of methylethylphosphinoborine trimer was found to be 4.25. The partially chlorinated material was resealed in a tube with 7.6852 g. (5.00 moles) of fresh CCl₄ and heated at 130° C. for an additional 25 hours. An additional weight loss of (0.0510 g.) was sufficient to raise the average number of chlorine atoms per mole of [CH₃(C₂H₅)₂PBH₂]₃ to 4.99. The final product,

[CH₃(C₂H₅)PBCl₂]₂CH₃(C₂H₅)PBHCl was a low melting waxy solid.

EXAMPLE IV

A solution of 0.0530 g. (0.179 mmole) [(CH₃)₂PBH₂]₄ in 2.9020 g. CHCl₃ was sealed in a heavy-wall Pyrex tube under vacuum. The tube was heated for 76.5 hours at 135° C. On cooling the tube to 25° C. a crystalline precipitate was observed floating in the solution. The cooled tube was opened and the solvent was distilled into a tared tube. From the weight loss of the solvent an average of 4.68 gram-atoms of chlorine per mole of [(CH₃)₂PHB₂]₄ had been introduced. The solvent was returned to the tube containing the partially chlorinated dimethylphosphinoborine tetramer. The tube was resealed and heated for an additional 383 hours. The solvent was again removed and found to weigh 2.8668 g. Approximately 0.3 cc. of CH₄ had also been formed. From the loss in weight of the solvent and the CH₄ produced, an average of 5.8 gram-atoms of chlorine per mole of

[(CH₃)₂PBH₂]₄ had been introduced. A sample of the product after recrystallization from chloroform had a melting point of 320–323° C. and analyzed 33.2 percent Cl corresponding to 4.08 gram-atoms chlorine per mole of [(CH₃)₂PBH₂]₄.

EXAMPLE V

A 0.2135 g. (0.9633 mmole) sample of [(CH₃)₂PBH₂]₃ was sealed in a Pyrex tube with 0.0605 g. (0.454 mmole) AlCl₃ and 3.0936 g. (20.110 mmole) CCl₄. The tube was heated in a refluxing bath of CCl₄ for 1.25 hours during which time a crystalline precipitate was formed. The cooled tube was opened and the solvent was distilled into a tared weighing tube. The recovered solvent weighed 2.8942 g. indicating that 6.01 gram-atoms of chlorine had exchanged with hydrogen per mole of dimethylphosphinoborine trimer. The [(CH₃)₂PBCl₂]₃, after washing three times with water to remove AlCl₃, melted at 376–7° C.

EXAMPLE VI

A 0.0877 g. (0.300 mmole) sample of [(CH₃)₂PBH₂]₄ and 0.1820 g. (1.365 mmoles) AlCl₃ were sealed in a Pyrex tube with an excess of CH₃Cl (4 ml.) which served as a solvent for the reaction mixture as well as a reactant. The reaction was allowed to proceed for 135 hours at 25° C. and yielded 40.7 cc. CH₄ indicating that 6.12 gram-atoms chlorine per mole [(CH₃)₂PBH₂]₄ had been exchanged for hydridic hydrogen. The tube was resealed and heated to 80 ±10° C. for 4½ days in an autoclave producing an additional 4.4 cc. CH₄. Based on the volume of CH₄ produced, 6.78 gram-atoms chlorine per mole of [(CH₃)₂PBH₂]₄ had exchanged.

EXAMPLE VII

A 0.3248 g. (1.465 mmoles) sample of [(CH₃)₂PBH₂]₃ and 0.7245 g. (1.777 mmoles) AlI₃ were sealed in a Pyrex tube with an excess of CH₃I (3 ml.) which served as a solvent for the reaction mixture as well as a reactant. The mixture was heated at 50 °C. for 55 hours producing 194.3 cc. CH₄ (98.6 percent yield). The CH₃I was distilled from the tube under vacuum. The resulting solids were treated with a sufficient quantity of CH₂I₂ to dissolve the product from which AlI₃ was removed by washing three times with water. On evaporating to dryness the organic layer yielded 1.3564 g. (1.388 mmoles) [(CH₃)₂PBI₂]₃. The dimethylphosphinodiiodoborine trimer decomposed rapidly above 400° C. without preliminary melting.

EXAMPLE VIII

A 0.2394 g. (1.080 mmoles) sample of [(CH₃)₂PBH₂]₃ and 0.3690 g. AlBr₃ (1.485 mmoles) were sealed in a Pyrex tube with an excess of CH₃Br (3 ml.) which served as a solvent for the reaction mixture as well as a reagent. The mixture after standing 15 hours at 25° C. had produced 141.2 cc. CH₄ (97.3 percent yield). The CH₃Br was distilled from the tube under vacuum. The resulting solids were treated with a sufficient quantity of CHBr₃ to dissolve the product from which AlBr₃ was removed by washing three times with water. On evaporating to dryness the organic layer yielded 0.7369 g. (1.060 mmoles) [(CH₃)₂PBBr₂]₃. The dimethylphosphinodibromoborine timer decomposed rapidly above 400° C. without preliminary melting.

EXAMPLE IX

A 0.2544 g. (1.148 mmoles) sample of [(CH₃)₂PBH₂]₃ and 0.1830 g. AlCl₃ (1.372 mmoles) were sealed in a Pyrex tube with an excess of CH₃Cl (3 ml.) which served as a solvent for the reaction as well as a reagent. The mixture after standing for 12 hours at 25° C. had produced 149.8 cc. CH₄ (97.1 percent yield). The CH₃Cl was distilled from the tube under vacuum. The resulting solids were treated with a sufficient quantity of CHCl₃ to dissolve the product from which AlCl₃ was removed by washing three times with water. On evaporating to dryness the organic layer yielded 0.4875 g. (1.138 mmoles) [(CH₃)₂PBCl₂]₃ melting at 377–8° C.

EXAMPLE X

In a preparation similar to that set forth in Example VI above, 0.1879 g. (1.409 mmoles) aluminum chloride was used as the catalyst, 3 ml. methyl bromide as the halogenating agent and solvent for 0.2794 g. (1.261 mmoles) dimethylphosphinoborine trimer. The reaction products were methane and 0.6830 g. of a halogenated material having the empirical composition

[(CH₃)₂PBCl₀.₆₁₇Br₁.₃₈₃]₃

EXAMPLE XI

Into an 80 ml. glass bomb tube containing 0.3558 g.

(4.82 mmoles as monomer) of dimethylphosphinoborine linear polymer and 0.70 g. (5.2 mmoles) of aluminum chloride was condensed about 6 ml. of methyl chloride. The tube was sealed and allowed to stand at room temperature for 18 hours. The tube was opened and 213.6 cc. (98.9%) of methane was collected. The excess methyl chloride was removed and the yellow contents of the tube were extracted with boiling chloroform but only an estimated 0.03 g. of material was extracted. The insoluble product was next washed with boiling water, 4–10 ml. portions of 4 N hydrochloric acid, 3–10 ml. portions of distilled water and 3–10 ml. portions of methanol, leaving 0.5396 g. (78.6%) of a colorless product, M.P. above 360° C., which analyzed: C, 18.00; H, 5.02; Cl, 45.24; Calc. for $C_2H_6PBCl_2$: C, 18.82; H, 4.23; Cl, 49.66.

EXAMPLE XII

A 0.2437 g. (1.099 mmoles) quantity of

was sealed in a tube together with 0.4205 g. (3.154 mmoles) $AlCl_3$ and 4 ml. n-$C_4H_9Cl$. As the tube warmed to room temperature a vigorous gas evolution was observed and the mixture turned to a gummy orange-colored mass. After standing for 4 days without further change, the tube was opened, and the volatile materials were removed and analyzed by infrared and vapor chromatographic techniques with the following results: 2.84 cc. $H_2$, 323 cc. HCl, 215 cc. n-$C_4H_{10}$, 34.4 cc. i-$C_4H_{10}$, and the solvent which now contained 58.5% n-$C_4H_9Cl$, 35.9% s-$C_4H_9Cl$, and lesser amounts of $C_2$ and $C_3$ chlorides. From the residue, which was dissolved in $CHCl_3$ and washed with dilute HCl, was isolated a 0.8138 g. mixture of an orange oil and colorless solid. The solid $$[(CH_3)_2PBCl_2]_3$$

having a M.P. of 378–385° C. was isolated in 91.4% yield (0.4301 g.).

EXAMPLE XIII

A mixture of 10.04 g. (45.3 mmoles) $[(CH_3)_2PBH_2]_3$, 2.85 g. (21.4 mmoles) $AlCl_3$, and 110 ml. $CCl_4$ was refluxed for 1 hour. The temperature dropped from 76° C. to 72° C. during the first 10 minutes. The cooled mixture was washed with 12 N HCl and three times with water. The $CCl_4$ solution was evaporated to dryness and the 19.4 g. (100%) residue was recrystallized from chloroform. The density of the product, $[(CH_3)_2PBCl_2]_3$, was determined, $d_{25} = 1.44$.

Details regarding additional runs which may be made using other phosphinoborines and various typical catalysts and halogenating agents are set out in tabular form below.

alkyl halides and acetic acid. This reaction proceeds readily at room temperature and generally requires a reaction time of only a few minutes. Permissible reaction temperatures are found within the range of −50° to 200° C. depending on the halogen employed. Chlorine may be used at the lower of the temperatures, bromine at somewhat higher temperatures and iodine at the highest temperatures.

Various examples illustrative of this phase of the process are set forth below.

EXAMPLE XXII

A 25 ml. aliquot of 0.1255 N $Br_2$ solution (3.138 mmoles) in bromobenzene was added to 0.0550 g. (0.248 mmole) $[(CH_3)_2PBH_2]_3$ dissolved in 25 ml. of bromobenzene. An excess of aqueous 20% KI solution (25 ml.) and 2 g. $NaHCO_3$ were added to the mixture immediately. A total of 16.35 ml. of 0.1000 N $As_2O_3$ was required to titrate the liberated iodine. Thus, 1.505 m./eq. $Br_2$ were used up or 3.03 gram-atoms bromine were introduced per mole of $[(CH_3)_2PBH_2]_3$.

EXAMPLE XXIII

Two separately weighed samples of $[(CH_3)_2PBH_2]_3$ were each dissolved in 5 ml. of $CH_2Br_2$. 25 ml. of a solution of bromine in $CH_2Br_2$ was added to each solution of the trimer. After 10 minutes, the addition of potassium iodide gave no indication of excess bromine. Both samples were washed with water and evaporated to dryness. Recrystallization of sample A (see Table 2) from methanol-water yielded colorless needles, M.P. 127–129° C. The compound was analyzed for carbon and hydrogen and its molecular weight was determined isopiestically with the following results: C, 18.25%; H, 5.74%; M, 359; calc. for $(CH_3)_6P_3B_3H_4Br_2$: C, 18.99%; H, 5.84%; M, 379.46.

*Table 2*

| Wt. Trimer, gms. | Millieq. Trimer | Wt. $Br_2$, gms. | Millieq. $Br_2$ | Wt. Product, gms. | Percent Substitution | Br/Trimer |
|---|---|---|---|---|---|---|
| A. 0.5225 | 28.28 | 0.7389 | 9.2579 | 0.9235 | 32.74 | 1.984 |
| B. 0.4979 | 26.95 | 0.7389 | 9.2579 | 0.8124 | 34.35 | 2.061 |

EXAMPLE XXIV

A solution containing 1.9840 g. (12.41 mmoles) of bromine in 2 ml. of methylene bromide was added in 3 minutes to 0.9155 g. (4.130 mmoles) of dimethylphosphinoborine trimer dissolved in 15 ml. of methylene bromide at room temperature. The solution became hot and

*Table 1*

| Example | Phosphinoborine | Phosphinoborine Grams | Phosphinoborine mmoles | $AlX_3$ X | $AlX_3$ Grams | $AlX_3$ mmoles | Halogenated Hydrocarbon Compound | Halogenated Hydrocarbon Grams | Halogenated Hydrocarbon mmoles | Halogenated Phosphinoborine Product |
|---|---|---|---|---|---|---|---|---|---|---|
| XIV | $[(n-C_5H_{11})_2PBH_2]_3$ | 0.7041 | 1.262 | I | 0.462 | 1.134 | $CH_2I_2$ | 1.1461 | 4.2785 | $[(C_5H_{11})_2PBI_2]_3$ |
| XV | $[n-C_3H_7(C_2H_5)PBH_2]_3$ | 0.671 | 1.928 | Br | 0.252 | 0.946 | $CH_2Br_2$ | 1.820 | 19.164 | $[n-C_3H_7(C_2H_5)PBBr_2]_3$ |
| XVI | $[(C_2H_5)_2PBH_2]_3$ | 1.337 | 4.370 | Cl | 0.248 | 1.864 | $CCl_4$ | 1.605 | 10.431 | $[(C_2H_5)_2PBCl_2]_3$ |
| XVII | $[(n-C_4H_9)_2PBH_2]_3$ | 6.238 | 13.161 | Br | 1.798 | 6.741 | $CHBr_3$ | 1.725 | 34.352 | $[(n-C_4H_9)_2PBBr_2]_3$ |
| XVIII | $[n-C_{12}H_{25}(CH_3)PBH_2]_3$ | 2.875 | 3.472 | Cl | 0.349 | 2.623 | $CCl_4$ | 3.041 | 19.766 | $[n-C_{12}H_{25}(CH_3)PBCl_2]_3$ |
| XIX | $[CH_3(i-C_3H_7)PBH_2]_3$ | 1.079 | 3.526 | Cl | 0.332 | 2.492 | $CCl_4$ | 2.140 | 13.913 | $[CH_3(i-C_3H_7)PBCl_2]_3$ |
| XX | $[(C_6H_{11})_2PBH_2]_3$ | 4.997 | 7.931 | Cl | 1.149 | 8.621 | $CH_2Cl_2$ | 6.1285 | 72.151 | $[(C_6H_{11})_2PBCl_2]_3$ |
| XXI | $[CH_2(CH_2)_3PBH_2]_3$ | 7.929 | 26.431 | Cl | 0.365 | 2.741 | $CCl_4$ | 1.3169 | 8.902 | $[CH_2(CH_2)_3PBCl_2]_3$ |

The second of the alternative methods for halogenating an already formed phosphinoborine involves the treatment with a free halogen of a phosphinoborine of the type $[RR'PBHR'']_n$ where n is an integer indicative of the degree of polymerization and where R and R' are hydrocarbon radicals and R'' is either hydrogen or a hydrocarbon radical. Preferably the halogen is dissolved in a corresponding liquid halogenated hydrocarbon. Preferred solvents are the halogenated benzene compounds, liquid hydrogen bromide was evolved. The solvent was removed under vacuum and the yellow residue was recrystallized from a 10:1 methanol-water mixture giving 1.099 g. of colorless material, M.P. 133–142° C. (corr.). A second crop of 0.477 g. of colorless crystals, M.P. 105–109° C. (corr.) was also obtained. The first crop was recrystallized from a 1:1 cyclohexane-Skelly "F" mixture giving crystals having M.P. 155–164° C. (corr.) analyzing Br, 55.6. (Calc. for $C_6H_{21}P_3B_3Br_3$, Br, 52.3). A total of 1.659 g.

(86.9%) of material assumed to be tribromide was obtained.

additional runs which may be made using free halogen in the B-halogenation process.

*Table 3*

| Example | Phosphinoborine | Phosphinoborine | | Solvent | Halogen | Halogen Added | | Halogenated Phosphinoborine Product |
|---|---|---|---|---|---|---|---|---|
| | | Grams | mmoles | | | Grams | mmoles | |
| XXIX | $[C_2H_5(CH_3)PBH_2]_3$ | 0.1507 | 0.5708 | $CH_2Br_2$ | $Br_2$ | 0.5476 | 3.426 | $[C_2H_5(CH_3)PBBr_2]_3$ |
| XXX | $[CH_3(i-C_3H_7)PBH_2]_3$ | 0.0827 | 0.2704 | $CH_2Cl_2$ | $Cl_2$ | 0.1157 | 1.631 | $[CH_3(i-C_3H_7)PBCl_2]_3$ |
| XXXI | $[n-C_7H_{15}(CH_3)PBH_2]_3$ | 0.8266 | 1.7438 | $CH_2I$ | $I_2$ | 1.3328 | 5.251 | $[n-C_7H_{15}(CH_3)PBHI]_3$ |
| XXXII | $[n-C_{12}H_{25}(CH_3)PBH_2]_3$ | 0.2090 | 0.3056 | $CHCl_3$ | $Cl_2$ | 0.1308 | 1.844 | $[C_{12}H_{25}(CH_3)PBCl_2]_3$ |
| XXXIII | $[(C_6H_{11})_2PBH_2]_3$ | 0.3064 | 0.4864 | $CCl_4$ | $Cl_2$ | 0.1045 | 1.473 | $[(C_6H_{11})_2PBHCl]_3$ |
| XXXIV | $[(C_6H_5)_2PBH_2]_3$ | 0.6450 | 1.0858 | $CHBr_3$ | $Br_2$ | 1.0466 | 6.548 | $[(C_6H_5)_2PBBr_2]_3$ |
| XXXV | $[(p-CH_3C_6H_4)_2PBH_2]_3$ | 0.1397 | 0.2060 | $CH_2Br_2$ | $Br_2$ | 0.1963 | 1.228 | $[(p-CH_3C_6H_4)_2PBBr_2]_3$ |
| XXXVI | $[CH_2(CH_2)_3PBH_2]_3$ | 0.2874 | 0.9580 | $CH_3COOH$ | $Br_2$ | 0.4626 | 2.894 | $[CH_2(CH_2)_3PBHBr]_3$ |
| XXXVII | $[(C_2H_5)_2PBH_2]_3$ | 0.1022 | 0.3340 | $CHBr_3$ | $Br_2$ | 0.3302 | 2.066 | $[(C_2H_5)_2PBBr_2]_3$ |

EXAMPLE XXV

To a stirred ice cold solution of 1.4897 g. (6.720 mmoles) of dimethylphosphinoborine trimer in 35 ml. ether was added in 5 minutes 3.2219 g. (20.16 mmoles) of bromine. After being stirred for 35 minutes at room temperature, the solvent and hydrogen bromide was removed from the yellow solution under vacuum. The colorless residue was recrystallized as in Example XXIV. The first crop of crystals from methanol-water weighed 1.735 g. (55.7%) and had M.P. 110–116° C. (corr.). Recrystallization from cyclohexane-Skelly "F" gave crystals, M.P. 119–126° C. (corr.) analyzing: Br, 53.4. (Calc. for $C_6H_{21}P_3B_3Br_3$, Br, 52.3.)

EXAMPLE XXVI

To a solution of 0.9233 g. (4.165 mmoles) of dimethylphosphinoborine trimer in 25 ml. glacial acetic acid was added in 10 minutes 4.765 ml. (12.499 mmoles) of 2.623 M bromine in acetic acid solution. The reaction temperature was 20±5° C. Immediately after bromine addition was completed, 50 ml. of water was added to the reaction mixture and the resulting precipitate was isolated by filtration. The product was recrystallized from absolute methanol. The first crop of crystals weighing 1.197 g. (62.7%) had M.P. 113–120° C. (corr.), and analyzed: C, 15.97; H, 4.79; P, 18.68; B, 7.25; Br, 52.22. (Calc. for $C_6H_{21}P_3B_3Br_3$: C, 15.72; H, 4.74; P, 20.28; B, 7.08; Br, 52.30.) A total of 1.523 g. (79.8%) of purified tribromide was obtained.

EXAMPLE XXVII

Following the procedure of Example XXVI, 20.1433 g. (0.09084 mole) of dimethylphosphinoborine trimer in 550 ml. of glacial acetic acid was treated with 43.6 g. (0.273 mole) of bromine in 85 ml. of acetic acid. A total of 31.16 g. (74.8%) of tribromide, M.P. 109–115° C. (corr.) was obtained after recrystallization from absolute methanol analyzing: C, 15.64; H, 4.72; P, 20.2; B, 7.08; Br, 52.19. (Calc. for $C_6H_{21}P_3B_3Br_3$: C, 15.72; H, 4.74; P, 20.28; B, 7.08; Br, 52.30.) Second and third crops of tribromide brought the total isolated yield to 38.1 g. (91.5%) although the last crops had lower melting points than the first.

EXAMPLE XXVIII

Following the procedure of Example XXVI, 9.240 ml. (24.24 mmoles) of 2.623 M bromine in glacial acetic acid was added to 0.8961 g. (4.042 mmoles) of dimethylphosphinoborine trimer in 25 ml. of glacial acetic acid. Recrystallization of the product from methanol and methanol-benzene mixtures gave four different fractions which ranged in melting point from 126–207° C., none of which analyzed for the hexabromide and probably are mixtures of tri, tetra, penta and hexabromides. An infrared spectrum of the highest melting fraction, which analyzed: C, 13.82; H, 4.12; Br, 59.00, was obtained for reference.

The table below sets forth reactants and quantities for

The third alternative by means of which phosphinoborines of the type $[RR'PBHR'']_n$ may be converted to B-halogenated phosphinoborines involves the treatment of such phosphinoborines with a hydrohalogen acid in either the liquid or gaseous state. No solvent is needed in the practice of this method and, because of the exothermic nature of the reaction, it is preferred to cool the phosphinoborine into which the hydrohalogen acid is run to a sufficient degree that the mixture may be warmed to initiate the reaction. Ready methods of suitably cooling the reaction vessel containing the phosphinoborine are by means of a Dry Ice bath or liquid nitrogen.

Lower temperatures slow the reaction somewhat while it becomes progressively more rapid as the temperature is allowed to increase. The permissible temperature range may be set out as −80° C. to +25° C. for liquid hydrohalogen acids and as 25° C. to 300° C. for gaseous acids.

EXAMPLE XXXVIII

A 0.1236 g. (0.5576 mmole) sample of $[(CH_3)_2PBH_2]_3$ was added to a large excess (25ml.) of anhydrous HF at −60° C. in a polyethylene bottle. An immediate evolution of $H_2$ was observed. The HF was distilled from the product, $[(CH_3)_2PBF_2]_3$, which was then washed with water. The product melted at 127–8° C.

EXAMPLE XXXIX

A 0.0955 g. (0.431 mmole) sample of $[(CH_3)_2PBH_2]_3$ was placed in a stainless steel cylinder which was then cooled to −196° C. and evacuated. Approximately 18 ml. of liquid anhydrous hydrogen chloride was condensed into the cylinder which was allowed to stand at 25° C. for 89 hours. After cooling to −196° C., 13.6 cc. $H_2$ was removed from the cylinder. An additional 121 hours at 25° C. yielded another 2.5 cc.$H_2$. The HCl was allowed to escape from the cylinder and the residue was extracted with four 3 ml. portions of methanol. The extract was evaporated to dryness. The product was isolated by sublimation at 150° C. under high vacuum from the solid chlorides of iron, chromium, and nickel which had also been formed. A total weight of 0.1001 g. of product analyzing 18.3% chlorine was obtained. Thus under these conditions 1.20 gram-atoms chlorine per mole of $[(CH_3)_2PBH_2]_3$ have been introduced in place of hydridic hydrogen.

EXAMPLE XL

A 0.0146 g. (0.0659 mmole) sample of $[(CH_3)_2PBH_2]_3$ was sealed in a Pyrex tube with 47.6 cc. of anhydrous HCl. The tube was heated for 43 hours at 300° C., during which time 2.30 cc. $H_2$ were produced (26.0% of theoretical). The product was inhomogeneous and melted at 70° C.

Details relating to various additional typical runs which are possible are set out below in Table 4; in each case the halogenation of a phosphinoborine by use of a hydrohalogen acid is shown.

Table 4

| Example | Phosphinoborine | Phosphinoborine Grams | Phosphinoborine mmoles | Anhydrous HX X | Anhydrous HX ml. | Halogenated Phosphinoborine Product |
|---|---|---|---|---|---|---|
| XLI | [C$_2$H$_5$(CH$_3$)PBH$_2$]$_3$ | 0.0825 | 0.3124 | F | 15 | [C$_2$H$_5$(CH$_3$)PBF$_2$]$_3$ |
| XLII | [n-C$_{12}$H$_{25}$(CH$_3$)PBH$_2$]$_3$ | 0.2613 | 0.3820 | F | 30 | [n-C$_{12}$H$_{25}$(CH$_3$)PBF$_2$]$_3$ |
| XLIII | [(C$_6$H$_5$)$_2$PBH$_2$]$_3$ | 0.0806 | 0.1357 | F | 15 | [(C$_6$H$_5$)$_2$PBF$_2$]$_3$ |
| XLIV | [(p-CH$_3$C$_6$H$_4$)$_2$PBH$_2$]$_3$ | 0.1634 | 0.2410 | F | 25 | [(p-CH$_3$C$_6$H$_4$)$_2$PBF$_2$]$_3$ |
| XLV | [CH$_2$(CH$_2$)$_3$PBH$_2$]$_3$ | 0.3362 | 1.1209 | F | 20 | [CH$_2$(CH$_2$)$_3$PBF$_2$]$_3$ |
| XLVI | [(C$_2$H$_5$)$_2$PBH$_2$]$_3$ | 0.1175 | 0.3841 | Br | 25 | [(C$_2$H$_5$)$_2$P]$_3$B$_3$H$_5$Br |

In each case (excepting where HF is used) the phosphinoborine reactant should be placed in an evacuated stainless steel cylinder and the phosphinoborine cooled in liquid nitrogen to about −196° C. In those cases where HF acid is used, a polyethylene bottle preferably serves as a reaction vessel.

In each case, after the addition of the appropriate acid, the mixture is allowed to warm sufficiently to initiate the reaction.

The B-halogenated compounds to which this invention is directed are new compositions of matter. Most of them are phosphinoborine polymers of ring configuration composed of between three and four phosphinoborine units, preferably three units, individual monomers of which have the formulae RR'PBYY' and $$CH_2(CH_2)_m PBYY'$$

wherein the symbols R and R' are alkyl, lower alkenyl, lower cycloalkyl, phenyl, lower alkyl-substituted phenyl, and wherein Y and Y' are either hydrogen or halogen, at least one of Y and Y' representing a halogen, and m is an integer of between 1 and 6. For a discussion of the structures of analogous trimers and tetramers, see application Serial No. 666,213, filed June 17, 1957 for Phosphinoborine Compounds and Their Preparation now Patent No. 2,925,440.

Alternatively, the monomers aforementioned may form linear chains through tetracoordinate boron-to-phosphorus bonding. See co-pending application Serial No. 678,429 filed August 15, 1957, and now abandoned for a discussion of analogous polymers. The new compositions of matter have the general formula (RR'PBYY')$_{n'}$, where n' is an integer greater than 4 and less than 1000. Similarly, the halogenated co-polymers of the general formula [RR'PBYY']$_4$[R''PBH] (e.g. Example II) are new compositions of matter. For details of the structure of the type polymers formed, see application Serial No. 680,625 filed August 27, 1957, for Phosphinoborine Compounds and Their Preparation. In each instance, the co-pending application referred to discloses polymers which are identical to those claimed here except that one or more hydrocarbons moieties or hydrogens of the compounds disclosed earlier are replaced with halogen here.

Obviously, many modifications and variations of the invention as hereinbefore set forth may be made without departing from the spirit and scope thereof, and therefore only such limitations should be imposed as are indicated in the appended claims.

This application is a continuation-in-part of application Serial No. 678,428 filed August 15, 1957 for Linear B-Halogenated Phosphinoborines and now abandoned and is also a continuation-in-part of application Serial No. 666,206 filed June 17, 1957, for Phosphinoborine Compounds and Their Preparation and now abandoned.

Where the symbols R and Y are used in the claims which follow, it is to be understood that the groups for which each R stands in a single unit or formula may be the same or different, and the units for which each Y stands in each unit or formula may be the same or different also.

We claim:
1. A process for preparing a B-halogenated phosphinoborine comprising: reacting with a halogenating agent selected from the class consisting of free halogens, hydrogen halides, and reactive halogenated hydrocarbons in which the halogen is bonded to a saturated carbon atom a phosphinoborine selected from the class consisting of phosphinoborines having the general formula [R$_2$PBH$_2$]$_n$ and phosphinoborines having the formula

$$[R_2PBH_2]_4[RPBH]$$

wherein each R is a hydrocarbon radical and n is an integer having the value of at least 3 indicative of the degree of polymerization.

2. The process of claim 1 wherein the phosphinoborine reacted has the general formula [R$_2$PBH$_2$]$_3$ where each R is as defined in claim 1.

3. A process for preparing a B-halogenated phosphinoborine comprising: reacting with a reactive halogenated hydrocarbon in which the halogen is bonded to a saturated carbon atom a phosphinoborine selected from the class consisting of phosphinoborines having the general formula [R$_2$PBH$_2$]$_n$ and phosphinoborines having the general formula [R$_2$PBH$_2$]$_4$[RPBH] wherein each R is a hydrocarbon radical and wherein n is an integer having the value of at least 3 indicative of the degree of polymerization.

4. The process of claim 3 wherein the phosphinoborine is dimethylphosphinoborine trimer and the halogenated hydrocarbon is CCl$_4$.

5. The process of claim 3 wherein the phosphinoborine is the dimethylphosphinoborine - methylphosphinoborine copolymer and the halogenated hydrocarbon is CCl$_4$.

6. The process of claim 3 wherein the phosphinoborine is methylethylphosphinoborine trimer and the halogenated hydrocarbon is CCl$_4$.

7. The process of claim 3 wherein the phosphinoborine is dimethylphosphinoborine tetramer and the halogenated hydrocarbon is CHCl$_3$.

8. The process of claim 3 wherein the reaction is carried out in the presence of an aluminum trihalide catalyst.

9. The process of claim 8 wherein the phosphinoborine is dimethylphosphinoborine trimer, the halogenated hydrocarbon is CCl$_4$ and the catalyst is AlCl$_3$.

10. The process of claim 8 wherein the phosphinoborine is dimethylphosphinoborine tetramer, the halogenated hydrocarbon is CH$_3$Cl and the catalyst is AlCl$_3$.

11. The process of claim 8 wherein the phosphinoborine is dimethylphosphinoborine trimer, the halogenated hydrocarbon is CH$_3$I and the aluminum trihalide is AlI$_3$.

12. The process of claim 8 wherein the phosphinoborine is dimethylphosphinoborine trimer, the halogenated hydrocarbon is CH$_3$Br and the aluminum trihalide is AlBr$_3$.

13. The process of claim 8 wherein the phosphinoborine is dimethylphosphinoborine trimer, the halogenated hydrocarbon is CH$_3$Cl and the aluminum trihalide is AlCl$_3$.

14. The process of claim 8 wherein the phosphinoborine is dimethylphosphinoborine trimer, the halogenated hydrocarbon is CH$_3$Br and the aluminum trihalide is AlCl$_3$.

15. The process of claim 8 wherein the phosphinoborine is dimethylphosphinoborine linear polymer, the halogenated hydrocarbon is $CH_3Cl$ and the aluminum trihalide is $AlCl_3$.

16. The process of claim 8 wherein the phosphinoborine is dimethylphosphinoborine trimer, the halogenated hydrocarbon is $C_4H_9Cl$ and the aluminum trihalide is $AlCl_3$.

17. A process for preparing a B-halogenated phosphinoborine comprising: reacting with a free halogen a phosphinoborine of the general formula $[R_2PBH_2]_n$ wherein each R is a hydrocarbon radical and $n$ is an integer having the value of at least 3 indicative of the degree of polymerization.

18. The process of claim 17 wherein the phosphinoborine is dimethylphosphinoborine trimer and the free halogen is bromine.

19. The process of claim 17 wherein the phosphinoborine is dimethylphosphinoborine trimer and the free halogen is bromine, the dimethylphosphinoborine being added in the form of a methylene bromide solution.

20. The process of claim 17 wherein the phosphinoborine is dimethylphosphinoborine trimer and the free halogen is bromine, the free halogen being added in the form of an acetic acid solution.

21. A process for preparing a B-halogenated phosphinoborine comprising: reacting with a hydrohalogen acid a phosphinoborine having the formula $[R_2PBH_2]_n$ wherein each R is a hydrocarbon radical and $n$ is an integer having the value of at least 3 indicative of the degree of polymerization.

22. The process of claim 21 wherein the phosphinoborine is dimethylphosphinoborine trimer and the hydrohalogen acid is HF.

23. The process of claim 21 wherein the phosphinoborine is dimethylphosphinoborine trimer and the hydrohalogen acid is HCl.

24. A phosphinoborine polymer of ring configuration composed of between 3 and 4 phosphinoborine units, each of said units having a formula selected from the group consisting of $[R_2PBY_2]$ and

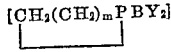

wherein each R is selected from the group consisting of alkyl, lower alkenyl, lower cycloalkyl, phenyl and lower alkyl-substituted phenyl, wherein each Y is selected from the class consisting of hydrogen and halogen, at least one of said Y symbols of at least one of the said units representing one of said halogens, and wherein $m$ is an integer of between 3 and 6.

25. A phosphinoborine polymer having a ring configuration and composed of between 3 and 4 monomeric phosphinoborine units, said polymer having the formula $[R_2PBY_2]_n$, wherein each R is selected from the class consisting of alkyl, lower alkenyl, lower cycloalkyl, phenyl and lower alkyl-substituted phenyl, wherein each of the Y symbols is selected from the class consisting of hydrogen and halogen, at least one of said Y symbols of at least one of the said units representing one of said halogens, and wherin $n$ is an integer of between 3 and 4.

26. A phosphinoborine polymer having a bicyclic ring configuration and the general formula $[R_2PBY_2]_4[RPBY]$ wherein each R is selected from the class consisting of alkyl, lower alkenyl, lower cycloalkyl, phenyl and lower alkyl-substituted phenyl and each Y is selected from the class consisting of hydrogen and halogen, at least one of said Y symbols representing one of said halogens.

27. A phosphinoborine polymer having a ring configuration and composed of between 3 and 4 monomeric phosphinoborine units, said polymer having the formula

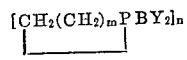

wherein each Y is selected from the class consisting of hydrogen and halogen, at least one said Y symbols representing one of said halogens and where $m$ is an integer of from 3 to 6 and where $n$ is an integer of between 3 and 4.

28. A phosphinoborine polymer having a ring configuration and the general formula $[(CH_3)_2PBX_2]_n$ where each X is halogen and $n$ is an integer of between 3 and 4.

29. A phosphinoborine polymer having a ring configuration and the general formula $[(CH_3)_2PBCl_2]_3$.

30. A phosphinoborine polymer having a ring configuration and the general formula $[(CH_3)_2PBCl_2]_4$.

31. A phosphinoborine polymer having a ring configuration and the formula $[(CH_3)_2PBCl_2]_4[CH_3PBH]$.

32. A phosphinoborine polymer having a ring configuration and the formula $[(CH_3)_2PBI_2]_3$.

33. A phosphinoborine polymer having a ring configuration and the formula $[(CH_3)_2PBBr_2]_3$.

34. A phosphinoborine polymer having a ring configuration and the formula $[(CH_3)_2PBF_2]_3$.

35. A phosphinoborine polymer having a ring configuration and the formula $[CH_3(C_2H_5)PBCl_2]_3$.

36. A phosphinoborine polymer having a ring configuration and the general formula $[R_2PBX_2]_n$, wherein each X is halogen, $n$ is an integer of between 3 and 4 and each R is lower alkyl.

37. A phosphinoborine polymer having a linear configuration and formed of a plurality of monomers of the general formula $[R_2PBY_2]$ joined to one another through tetracoordinate boron-to-phosphorus bonding, between about 4 and 1000 of said monomers constituting said chain, wherein each R is selected from the class consisting of alkyl, lower alkenyl, lower cycloalkyl, phenyl and lower alkyl-substituted phenyl and each Y is selected from the class consisting of hydrogen and halogen, at least one of said Y symbols representing one of said halogens.

38. The linear phosphinoborine of claim 37 wherein each R is methyl and each Y is chloro.

References Cited in the file of this patent

Wagner et al.: Abstract of Papers, 135 ACS Meeting, pages 49–0 to 50–0.